United States Patent [19]
Mizuta

[11] Patent Number: 4,754,209
[45] Date of Patent: Jun. 28, 1988

[54] MOTOR ACTUATOR

[75] Inventor: Ken Mizuta, Miyagi, Japan

[73] Assignee: Alps Electric Co., Ltd., Japan

[21] Appl. No.: 929,385

[22] Filed: Nov. 10, 1986

[30] Foreign Application Priority Data

Nov. 9, 1985 [JP] Japan ................................. 60-251177

[51] Int. Cl.$^4$ ............................................. G05B 11/14
[52] U.S. Cl. .................................. 318/673; 318/286; 318/467
[58] Field of Search ............... 318/445, 346, 466, 467, 318/468, 470, 519, 286, 672, 673, 266

[56] References Cited

U.S. PATENT DOCUMENTS

| | | | |
|---|---|---|---|
| 1,455,194 | 5/1925 | Eaton | 318/468 |
| 1,732,742 | 10/1929 | Dann | 318/468 |
| 2,048,074 | 7/1936 | Klein | 318/468 |
| 2,913,129 | 11/1959 | Lindstrom | 318/468 |
| 3,115,597 | 12/1963 | Salzberg et al. | 318/466 |
| 3,628,113 | 12/1971 | Steudl | 318/470 X |
| 4,412,424 | 11/1983 | Iida | 62/209 |
| 4,617,505 | 10/1986 | Sausner | 318/468 X |
| 4,631,461 | 12/1986 | Peugeot | 318/466 X |

Primary Examiner—William M. Shoop, Jr.
Assistant Examiner—Patrick C. Keane
Attorney, Agent, or Firm—Guy W. Shoup

[57] ABSTRACT

A plurality of mode switches are electrically connected in parallel to a motor. A conductor plate has a plurality of electric current passages each connected electrically to one of the switches. Each of the passages has a length corresponding to a rotating angle for which the motor is set. A slider is connected to a power source and contacts the passages so that, when one of the switches is closed, the slider may cause an electric current to be supplied to the motor through the passage connected to the closed switch. The slider is slidable along the passages with the rotation of the motor. Each of the passages has a portion at which the contact of the slider therewith is broken so that the supply of the electric current to the motor may be interrupted.

5 Claims, 4 Drawing Sheets

4,754,209

MOTOR ACTUATOR

BACKGROUND OF THE INVENTION

1. Field of the Invention:

This invention relates to a motor actuator which is provided in, for example, an air conditioner for an automobile.

2. Description of the Prior Art:

There is known a motor actuator which is equipped in, for example, an air conditioner for an automobile for controlling the amount of air leaving it or the angle of its flow. Its general construction is shown in FIGS. 4 and 5. It includes a switching device 21 having a plurality of switches 21a connected in parallel to a plurality of serially connected resistors 20. A comparison circuit 22 has an input connected to the switching device 21. A driving circuit 23 receives a control signal S from the comparison circuit 22. A motor 24 is driven by the driving circuit 23 to rotate a rotatable plate. A position sensor 25 is provided for detecting the position of the rotatable plate.

If one of the switches 21a is closed, a comparison signal V, which is defined by the voltage set by at least one resistor 20 ahead of the closed switch 21a, is inputted to the comparison circuit 22. The comparison circuit 22 outputs the control signal S to the driving circuit 23 so that the motor 24 may be driven to rotate the rotatable plate. When the rotatable plate has been rotated to a predetermined position, its position is detected by the position sensor 25 and the corresponding detection signal Sd is fed to the comparison circuit 22. The comparison circuit 22 compares the detection signal Sd with the comparison signal V and discontinues to output the control signal S. As a result, the motor 24 is stopped and the rotatable plate is fixed in its predetermined position.

The motor actuator as hereinabove described has, however, a number of drawbacks. It is expensive, as it includes a large number of parts. An electrical noise is likely to enter the comparison circuit and cause it to work erroneously. Therefore, it is impossible to ensure that the motor always be controlled accurately.

SUMMARY OF THE INVENTION

It is an object of this invention to provide an improved motor actuator which is inexpensive and yet works accurately.

This object is attained by a motor actuator comprising a plurality of mode switches which are electrically connected in parallel to a motor, a conductor plate having a plurality of electric current passages each connected electrically to one of the mode switches, each of the passages having a length corresponding to an angle of rotation for which the motor is set, and a slider connected to a power source and contacting the electric current passages so that, when one of the switches is closed, the slider may cause an electric current to be supplied to the motor through the passage connected to the closed switch, the slider being slidable along the passages with the rotation of the motor, each of the passages having a portion at which the contact of the slider therewith is broken so that the supply of the electric current to the motor may be interrupted.

The motor actuator of this invention is designed for setting the rotating angle of the motor mechanically and is, moreover, composed of only a small number of parts. Therefore, it is inexpensive and is substantially free from any failure or erroneous operation.

Other features and advantages of this invention will become apparent from the following description and the accompanying drawings.

DETAILED DESCRIPTION OF THE INVENTION

Figure 1:
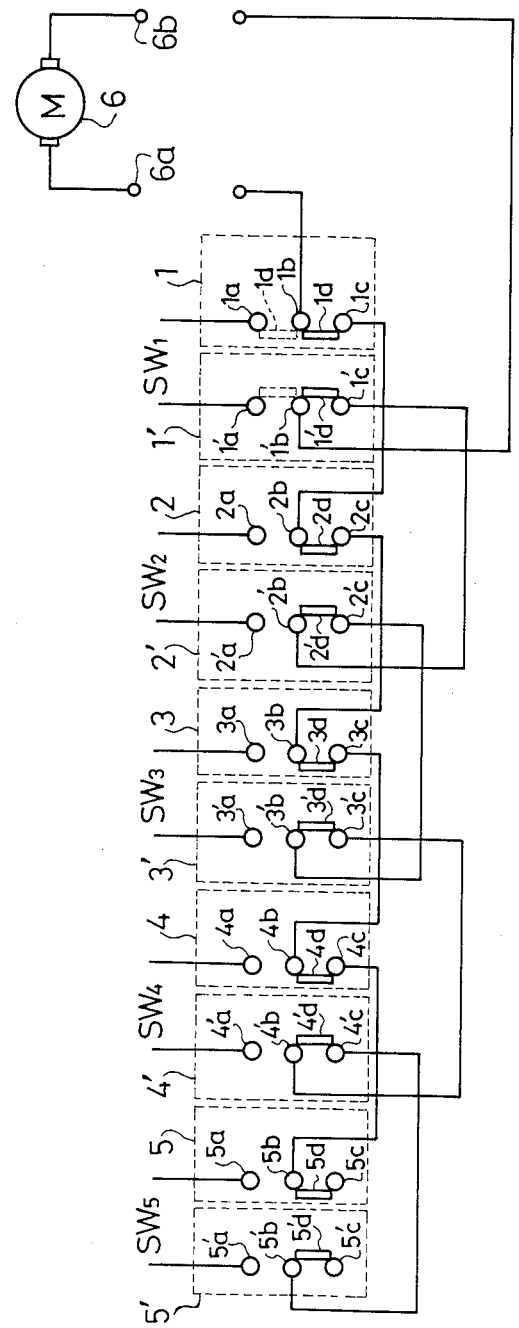
FIG. 1 is a diagram showing the wiring connection of mode switches in a motor actuator embodying this invention.
Figure 2:
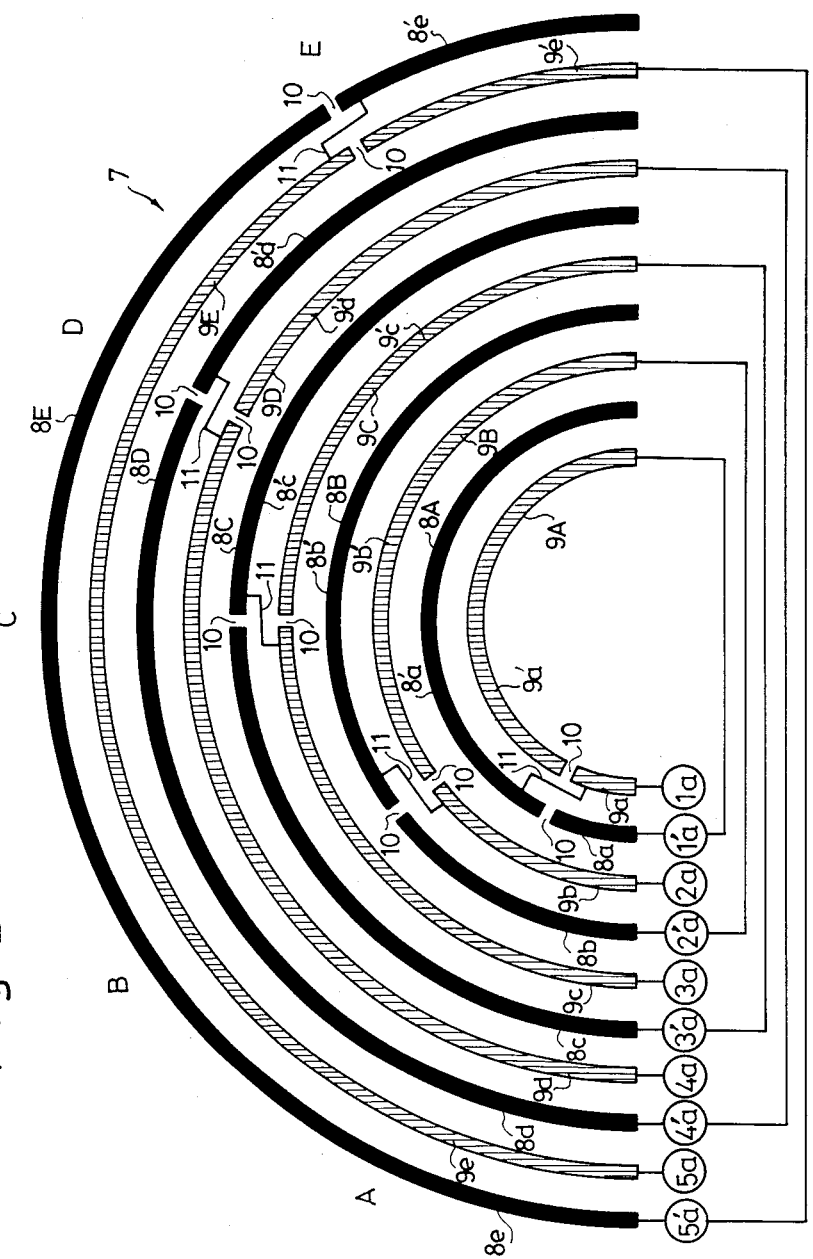
FIG. 2 is a front elevational view of a conductor plate in the motor actuator.
Figure 3:
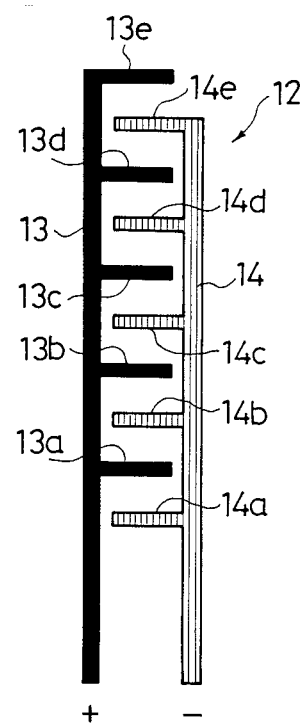
FIG. 3 is a side elevational view of a slider in the motor actuator.
Figure 4:
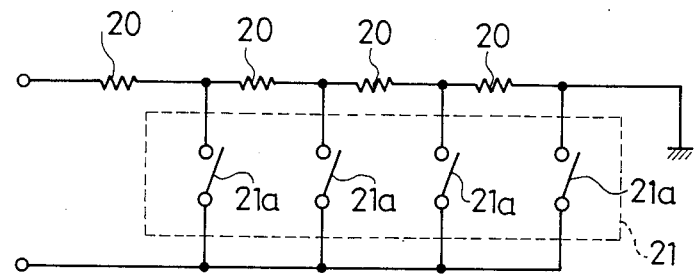
FIG. 4 is a wiring diagram for the switching device in a conventional motor actuator.
Figure 5:
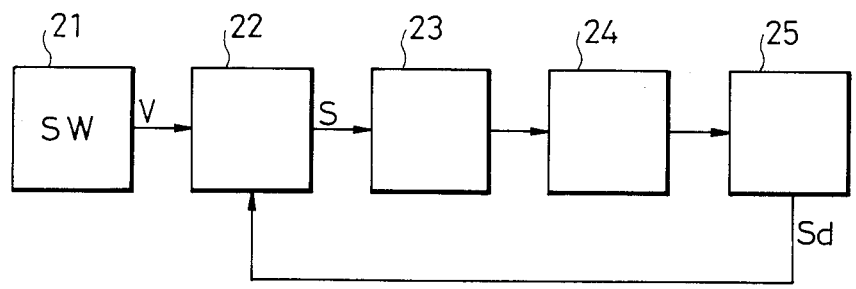
FIG. 5 is a block diagram for the conventional motor actuator.

A motor actuator embodying this invention is shown in FIGS. 1 to 3. It includes a plurality of mode switches $SW_1$ to $SW_5$. Each switch comprises a pair of switching sections, as shown in FIG. 1. For example, the switch $SW_1$ comprises a pair of switching sections 1 and 1' and the switch $SW_2$ comprises a pair of switching sections 2 and 2'. Each switching section has three terminals. For example, the switching section 3 has three terminals 3a to 3c and the switching section 3' has three terminals 3'a to 3'c. Each switching section also has a contact maker which is slidable for making contact between one of the three terminals and one of the other two terminals or the other. For example, the switching section 4 has a contact maker 4d which is slidable for making contact between the terminals 4a and 4b or between the terminals 4b and 4c.

The terminal 1b of the switch $SW_1$ is connected to one terminal 6a of a motor 6 of which the rotating angle is to be controlled and the terminal 1'b thereof is connected to the other terminal 6b of the motor 6. The terminal 1c of the switch $SW_1$ is connected to the terminal 2b of the switch $SW_2$, the terminal 2c of the switch $SW_2$ to the terminal 3b of the switch $SW_3$, the terminal 3c of the switch $SW_3$ to the terminal 4b of the switch $SW_4$, and the terminal 4c of the switch $SW_4$ to the terminal 5b of the switch $SW_5$ The terminal 1'c of the switch $SW_1$ is connected to the terminal 2'b of the switch $SW_2$, the terminal 2'c of the switch $SW_2$ to the terminal 3'd of the switch $SW_3$, the terminal 3'c of the switch $SW_3$ to the terminal 4'b of the switch $SW_4$, and the terminal 4'c of the switch $SW_4$ to the terminal 5'b of the switch $SW_5$.

A conductor plate 7 is electrically connected to the terminals 1a, 1'a, 2a, 2'a, 3a, 3'a, 4a, 4'a, 5a and 5'a of the switches $SW_1$ to $SW_5$, as shown in FIG. 2. The conductor plate 7 is semicircular and has five pairs of electric current passages 8A and 9A, 8B and 9B, 8C and 9C, 8D and 9D and 8E and 9E printed thereon. The passages 8A to 9E are all semicircular and are concentric to one another. Each of the passages 8A to 9E has a broken portion 10 at which it is divided into two passage segments. For example, the broken portion 10 of the passage 8A divides it into two segments 8a and 8a'. In each pair of passages, that segment of one of the passages which is located on one side of the broken portions 10 is electrically connected by a reversing line 11 to that segment of the other passage which is located on the other side of the broken portions 10. For example, the segments 8a' and 9a are electrically connected to each other by a reversing line 11. The terminals 1a, 2a, 3a, 4a and 5a of the switches SW₁ to SW₅ are connected to the passage segments 9a, 9b, 9c, 9d and 9e, respectively, while the terminals 1'a, 2'a, 3'a, 4'a and 5'a are connected to the segments 8a and 9a', 8b and 9b', 8c and 9c', 8d and 9d' and 8e and 9e', respectively.

A slider 12 is slidably in contact with the electric current passages 8A to 9E. The slider 12 comprises a first sliding member 13 connected to the plus terminal of a power source not shown and a second sliding member 14 connected to the minus terminal thereof. The first sliding member 13 has five projections 13a to 13e which are slidably in contact with the passages 8A, 8B, 8C, 8D and 8E, respectively. Likewise, the second sliding member 14 has five projections 14a to 14e which are slidably in contact with the passages 9A, 9B, 9C, 9D and 9E, respectively. The slider 12 has one end connected rotatably to the center of the conductor plate 7, i.e., the center of the arcuate passages 8A to 9E, and is rotatable for sliding along the passages with the rotation of the motor 6.

In operation, if the contact makers 1d and 1'd of the mode switch SW₁ are moved to their positions shown by broken lines in FIG. 1, the terminal 6a of the motor 6 is electrically connected to the electric current passage segment 9a on the conductor plate 7 through the terminals 1a and 1b of the switch SW₁, and the other terminal 6b to the segment 8a through the terminals 1'a and 1'b. If the projections 13a and 14a of the slider 12 are in contact with the passage segments 8a and 9a, respectively, a plus voltage is applied to the terminal 6b of the motor 6 through the projection 13a, passage segment 8a, terminal 1'a, contact maker 1'd and terminal 1'b, while a minus voltage is applied to the terminal 6a of the motor 6 through the projection 14a, passage segment 9a, terminal 1a, contact maker 1d and terminal 1b, whereby the motor 6 is driven for rotation in one direction. The rotation of the motor 6 causes the slider projections 13a and 14a to slide along the passage segments 8a and 9a, respectively. When the motor 6 has been rotated by a certain angle, the projections 13a and 14a reach the broken portions 10 of the passages 8A and 9A, respectively, which are radially aligned as shown at a point A in FIG. 2, whereupon the supply of an electric current to the motor 6 is interrupted and its rotation is discontinued.

If the contact makers 5d and 5'd of the switch SW₅ are moved to connect electrically the terminal 6a of the motor 6 to the passage segment 8e through the terminals 5a and 5b and the other terminal 6b thereof to the segment 9e through the terminals 5'a and 5'b, a plus voltage is applied to the terminal 6b of the motor 6 through the projection 13e, passage segment 8e, terminal 5'a, contact maker 5'd, terminal 5'b and contact makers 4'd, 3'd, 2'd and 1'd, while a minus voltage is applied to the terminal 6a of the motor 6 through the projection 14e, segment 9e, terminal 5a, contact maker 5d, terminal 5b and contact makers 4d, 3d, 2d and 1d. As a result, the motor 6 is driven for rotation in one direction again and the slider projections 13e and 14e slide along the passage segments 8e and 9e, respectively. When the motor 6 has been rotated by a certain angle, the slider projections 13e and 14e reach the broken portions 10 of the passages 8E and 9E, respectively, at a point E shown in FIG. 2, whereupon the supply of the electric current to the motor 6 is interrupted and its rotation is discontinued.

The same rotation of the motor 6 also takes place if any of the switches SW₂ to SW₄ is closed. Its rotation stops as soon as the sliding members 13 and 14 reach a point B, C or D in FIG. 2.

If the contact makers 1d and 1'd of the switch SW₁ are moved to their positions shown by the broken lines in FIG. 1 when the sliding members 13 and 14 stay at the point E in FIG. 2, a plus voltage is applied to the terminal 6a of the motor 6 through the slider projection 13a, passage segment 8a, reversing line 11, passage segment 9a, terminal 1a, contact maker 1d and terminal 1b, while a minus voltage is applied to the other terminal 6b of the motor 6 through the slider projection 14a, passage segment 9a', terminal 1'a, contact maker 1'd and terminal 1'b. As a result, the motor 6 is driven for rotation in the opposite direction and the sliding members 13 and 14 are rotated in the opposite direction along the conductor plate 7. The supply of the electric current to the motor 6 and its rotation are discontinued when the slider projections 13a and 14a have reached the broken portions 10 of the electric current passages 8A and 9A at the point A in FIG. 2.

According to this invention, it is, therefore, possible to control the rotating angle of the motor 6 by rotating it in one or the other direction, wherever the sliding members 13 and 14 may stay.

Although the conductor plate 7 has been described as being semicircular, it is alternatively possible to use a rectangular conductor plate having straight electric current passages and a slider which is movable in a straight line.

The broken portions 10 of the electric current passages are located in different radial positions from one pair of passages connected to one of the mode switches to another pair connected to another switch, as shown in FIG. 2. Therefore, if all of the switches SW₁ to SW₅ are closed at a time, they work in the order of SW₁ to SW₅ to cause the motor 6 to rotate in one direction, or in the order of SW₅ to SW₁ to cause it to rotate in the opposite direction, depending on the position where the slider 12 happens to stay.

What is claimed is:

1. A motor actuator comprising:
 a motor having first and second actuation terminals and a rotary output member, said motor being actuated by power applied to said first and second actuation terminals to drive its rotary output member in a forward direction to a selected one of a plurality of angular stopping positions;
 a power source having a pair of power terminals;
 a conductor plate having a plurality of pairs of first and second conductors arranged mutually parallel to one another, wherein in each conductor pair said first and second conductors have complementary energized lengths separated from non-energized lengths by a non-conducting break, and wherein said plurality of conductor pairs are arranged on said conductor plate in order of progressively increasing energized lengths separated by the breaks from decreasing non-energized lengths in one direction of said conductor plate, such that the energized lengths of one conductor pair is greater than that of the preceding conductor pair and less than that of the succeeding conductor pair;
 a slider having a first sliding member electrically connected to one power terminal of said power source and having a plurality of electrical contacts for sliding on the first conductors of said plurality of conductor pairs, and a second sliding member electrically connected to the other power terminal of said power source and having a plurality of contacts for sliding on the second conductors of said plurality of conductor pairs, said slider being arranged to slide on said conductor pairs in the one direction of said conductor plate in conjunction with rotation of the rotary output member of said motor in the forward direction; and a plurality of position switches each associated with a respective one of said plurality of conductor pairs and a respective one of the angualr stopping positions of the motor output member, each said position switch being arranged to be selectively actuated to electrically connect the energized lengths of the first and second conductors of said respective one of said conductor pairs with the first and second actuation terminals of said motor, whereby when a selected position switch is actuated, power from said power source provided through said slider is transmitted through the corresponding energized lengths of the respective conductor pair and provided through the actuated switch to the terminals of said motor, and the rotary output member is driven to rotate in the forward direction in conjunction with sliding movement of the slider along the conductor pair in the one direction of said conductor plate, until said slider reaches the break of the conductor pair to terminate transmission of power to said motor and stop its rotary output member at the corresponding angular stopping position.

2. A motor actuator as set forth in claim 1, wherein said conductor plate has a semicircular shape and said conductors extend arcuately one around another in mutually concentric relation.

3. A motor actuator as set forth in claim 1, wherein said slider comprises a first sliding member connected electrically to the plus terminal of said power source and a second sliding member connected electrically to the minus terminal thereof.

4. A motor actuator as set forth in claim 1, wherein said slider has one end connected rotatably to the center of said conductor plate about which said conductors extend arcuately.

5. A motor actuator according to claim 1, wherein said motor is rotatable in forward and reverse directions, said pair of sliders are movable in one and the opposite directions of said conductors plate, and said non-energized lengths of the plurality of conductors pairs are connected to the respective position swi:ches and electrically contacted by said slider, such that upon actuation of a selected position switch, power is provided through said slider to the non-energized lengths of a respective one of the conductor pairs through the actuated switch so as to drive said rotary output member of said motor in the reverse direction to the corresponding angular stopping position.

* * * * *